United States Patent [19]
Yamamoto et al.

[11] Patent Number: 5,770,644
[45] Date of Patent: Jun. 23, 1998

[54] FIRE RETARDENT POLYESTER RESIN COMPOSITION AND PROCESS FOR PRODUCING THE SAME

[75] Inventors: Masanori Yamamoto; Shintarou Kishimoto, both of Tokyo-To, Japan

[73] Assignee: Mitsubishi Engineering Plastics Corporation, Tokyo-To, Japan

[21] Appl. No.: 806,651

[22] Filed: Feb. 26, 1997

[30] Foreign Application Priority Data

Feb. 26, 1996 [JP] Japan .................................. 8-037904
Jul. 9, 1996 [JP] Japan .................................. 8-179114

[51] Int. Cl.$^6$ ............................. C08K 5/49; C08K 5/52; C08K 5/51
[52] U.S. Cl. ..................... 524/120; 524/122; 524/127; 524/153
[58] Field of Search .................... 524/120, 122, 524/127, 153

[56] References Cited

U.S. PATENT DOCUMENTS

| | | | |
|---|---|---|---|
| 4,180,496 | 12/1979 | Yanagimoto et al. | 524/101 |
| 5,281,637 | 1/1994 | Blocker | 524/100 |
| 5,302,645 | 4/1994 | Nakano et al. | 524/120 |
| 5,420,184 | 5/1995 | Tsukahara et al. | 524/120 |

*Primary Examiner*—Kriellion S. Morgan
*Attorney, Agent, or Firm*—Oblon, Spivak, McClelland, Maier & Neustadt, P.C.

[57] ABSTRACT

A fire retardant polyester resin composition comprising (A) 95 to 30 parts by weight of a polyester resin and (B) 5.0 to 70 parts by weight of a polyphenylene ether resin and/or polyphenylene sulfide resin, and, for 100 parts by weight in total of the components (A) and (B), (C) 0.05 to 10 parts by weight of a compatibilizing agent, (D) 2.0 to 45 parts by weight of a phosphoric ester compound or phosphonitrile compound, (E) 0 to 150 parts by weight of a reinforcing filler, (F) 0.001 to 15 parts by weight of an anti-dripping agent, (G) 0 to 45 parts by weight of a melamine cyanurate, and (H) 0 to 15 parts by weight of a polystyrene resin having epoxy group, provided that the amount of the component (G) is from 0.5 to 45 parts by weight for 100 parts by weight in total of the components (A) and (B) when the amount of the component (B) is less than 35 parts by weight. The polyester resin composition scarcely corrodes a metal mold when it is molded, and is excellent in fire retardancy.

11 Claims, No Drawings

FIRE RETARDENT POLYESTER RESIN COMPOSITION AND PROCESS FOR PRODUCING THE SAME

BACKGROUND OF THE INVENTION

1. Field of the Invention

The present invention relates to a fire retardant polyester resin composition. More particularly, the present invention relates to a fire retardant polyester resin composition having excellent mechanical properties, flow characteristics, resistance to hydrolysis and dimensional stability as well as high fire retardancy.

2. Background Art

In recent years, thermoplastic polyester resins are widely used for injection-molded products such as automotive parts, electrical parts and electronic parts. Materials for use in these applications are now required to have not only excellent mechanical properties and molding properties but also high fire retardancy. Heretofore, organic fire retardants such as bromine- or chlorine-containing ones have been extensively used for polyester resins. However, these fire retardants are disadvantageous in that they evolve a large amount of hydrogen bromide or hydrogen chloride gas, which is poisonous and corrosive, and black smoke while they are burning.

Water-containing inorganic compounds such as magnesium hydroxide and aluminum hydroxide have been known as non-bromine or non-chlorine fire retardants. However, the fire-retardancy-imparting properties of these water-containing inorganic compounds are not so excellent as those of bromine or chlorine fire retardants. Therefore, in order to obtain a product having high fire retardancy by the use of such an inorganic compound, it is necessary to incorporate a large amount of the inorganic compound into a resin. If a large amount of the inorganic compound is incorporated into a resin, the resin considerably deteriorates in mechanical properties and molding properties.

Further, there has been known a method in which a nitrogen compound having triazine ring is incorporated into a resin as a fire retardant (Japanese Patent Publications Nos. 5939/1983 and 33850/1985). However, such a nitrogen compound is poor in fire-retardancy-imparting properties, and also has some other shortcomings; for instance, the nitrogen compound incorporated into a resin considerably deteriorates the resulting molded product in mechanical properties, stains the metal mold used, and bleeds at the surface of the resin. Furthermore, a variety of phosphorus compounds have also been known as non-bromine or non-chlorine fire retardants.

Red phosphorus is excellent in fire-retardancy-imparting properties. Therefore, even when a relatively small amount of red phosphorus is incorporated into a polyester resin, the resin can show high fire retardancy. However, the red phosphorus incorporated into the resin makes the final product reddish, and also considerably deteriorates the polyester resin in mechanical properties when the temperature and humidity are high. Red phosphorus is thus unsatisfactory from the practical point of view.

There has also been known a method in which a phosphoric ester fire retardant is incorporated into a resin (Japanese Patent Publications Nos. 19858/1976 and 39271/1976). However, fire retardants of this type are poor in fire-retardancy-imparting properties as compared with bromine or chlorine fire retardants. Therefore, in order to impart high fire retardancy to a resin by using such a phosphoric ester fire retardant, it is necessary to incorporate a large amount of this fire retardant into the resin. When a large amount of a phosphoric ester fire retardant is incorporated into a resin, the crystallinity of the resin is greatly lowered. The resin therefore undergoes remarkable deterioration in mechanical properties and molding properties. Moreover, the phosphoric ester fire retardant extremely lowers the resistance to hydrolysis of the polyester resin. In addition, the phosphoric ester fire retardant incorporated into the resin in a large amount in order to impart high fire retardancy to the resin not only severely causes plate-out when the resin is molded, but also bleeds at the surface of the final product. This makes the appearance of the final product poor, and brings about contact failure.

Japanese Laid-Open Patent Publication No. 47056/1985 discloses a fire retardant polyester resin composition which is obtained by adding a polyphenylene ether resin and a bromine or chlorine fire retardant to a thermoplastic linear polyester resin and an organic phosphoric ester so as to supplement the insufficient fire-retardancy-imparting properties of the phosphoric ester fire retardant. However, this composition has a drawback in that it evolves irritating gases and a large amount of black smoke while it is burning due to the bromine or chlorine fire retardant contained in the composition.

Furthermore, Japanese Laid-Open Patent Publication No. 339493/1993 discloses a fire retardant polyester resin composition comprising a saturated polyester resin, a polyphenylene ether resin and red phosphorus. Red phosphorus is poor in thermal stability, and makes the final product reddish, so that this composition is also still unsatisfactory from the practical point of view.

SUMMARY OF THE INVENTION

The present invention is intended to solve the aforementioned problems in the prior art.

An object of the present invention is therefore to provide a fire retardant polyester resin composition which comprises a fire retardant containing no bromine or chlorine atom, which evolves no corrosive gases when it is molded, which scarcely evolves irritating and corrosive gases and black smoke while it is burning and which has excellent mechanical properties, flow characteristics, resistance to hydrolysis, molding properties and dimensional stability as well as high fire retardancy.

We made earnest studies in order to attain the above object of the invention, and, as a result, found that a polyester resin composition comprising specific components having specific structures is excellent in fire retardant properties, mechanical properties, flow characteristics, resistance to hydrolysis and dimensional stability. The present invention has been accomplished on the basis of this finding.

Thus, the present invention provides a fire retardant polyester resin composition comprising the following components (A) to (H):

(A) 95 to 30 parts by weight of a polyester resin, and (B) 5.0 to 70 parts by weight of a polyphenylene ether resin and/or polyphenylene sulfide resin, and, for 100 parts by weight in total of the components (A) and (B), (C) 0.05 to 10 parts by weight of a compatibilizing agent, (D) 2.0 to 45 parts by weight of a phosphoric ester compound or phosphonitrile compound, (E) 0 to 150 parts by weight of a reinforcing filler, (F) 0.001 to 15 parts by weight of an anti-dripping agent, (G) 0 to 45 parts by weight of a melamine cyanurate, and (H) 0 to 15 parts by weight of a polystyrene resin having epoxy group, provided that the amount of the component (G) is from 0.5 to 45 parts by weight for 100 parts by weight in total of the components (A) and (B) when the amount of the component (B) is less than 35 parts by weight.

The present invention also provides a process for producing a fire retardant polyester resin composition comprising the following components (A) to (H):

(A) 95 to 30 parts by weight of a polyester resin, and (B) 5.0 to 70 parts by weight of a polyphenylene ether resin and/or polyphenylene sulfide resin, and, for 100 parts by weight in total of the components (A) and (B), (C) 0.05 to 10 parts by weight of a compatibilizing agent, (D) 2.0 to 45 parts by weight of a phosphoric ester compound or phosphonitrile compound, (E) 0 to 150 parts by weight of a reinforcing filler, (F) 0.001 to 15 parts by weight of an anti-dripping agent, (G) 0 to 45 parts by weight of a melamine cyanurate, and (H) 0 to 15 parts by weight of a polystyrene resin having epoxy group, provided that the amount of the component (G) is from 0.5 to 45 parts by weight for 100 parts by weight in total of the components (A) and (B) when the amount of the component (B) is less than 35 parts by weight, in which the polyester resin (the component (A)), the polyphenylene ether resin and/or polyphenylene sulfide resin (the component (B)) and the compatibilizing agent (the component (C)) are firstly melt-kneaded to form a mixture, and the mixture is then melt-kneaded with the other components (D) to (H) to obtain the desired fire retardant polyester resin composition.

The polyester resin composition of the present invention is excellent in fire retardancy. In addition, the composition contains no bromine or chlorine compound as a fire retardant, so that it scarcely evolves corrosive gases during the step of molding. Further, the composition is also excellent in mechanical properties, resistance to hydrolysis, flow characteristics and dimensional stability, and produces neither volatile products nor decomposition products when it is molded or used for a long period of time. Therefore, the polyester resin composition of the present invention can be suitably used for producing electrical parts and electronic parts.

DETAILED DESCRIPTION OF THE INVENTION

The polyester resin, the component (A), used for producing the fire retardant polyester resin composition of the invention is a thermoplastic polyester having an intrinsic viscosity of 0.50 or higher, obtained by the condensation polymerization of at least one bifunctional carboxylic acid component and at least one glycol component or hydroxycarboxylic acid. Specific examples of the bifunctional carboxylic acid component include terephthalic acid, isophthalic acid, 2,6-naphthalene-dicarboxylic acid, 2,7-naphthalenedicarboxylic acid, p,p-di-phenyldicarboxylic acid, p,p-diphenyl ether carboxylic acid, adipic acid, sebacic acid, dodecandioic acid, suberic acid, azelaic acid, and 5-sodium sulfoisophthalic acid, and ester-forming derivatives thereof. Of these, aromatic dicarboxylic acids and ester-forming derivatives thereof are preferred, and terephthalic acid and terephthalic diesters are particularly preferred.

Specific examples of the glycol component include those compounds which are represented by the general formula $HO(CH_2)_qOH$ wherein q is an integer of 2 to 20, such as alpha,omega-alkylene glycols, neopentyl glycol, 1,4-cyclohexanediol, 1,4-cyclohexanedimethanol, bisphenol A, polyoxy-ethylene glycol and polyoxytetramethylene glycol, and ester-forming derivatives thereof. Of these, alpha, omega-alkylene glycols such as ethylene glycol and 1,4-butanediol are preferred, and 1,4-butanediol is particularly preferred.

Specific examples of the hydroxycarboxylic acid include hydroxybenzoic acid and 4-(2-hydroxyethoxy)benzoic acid, and ester-forming derivatives thereof. When 70 mol % or more of all of the acid or diol components which are used for producing the polyester is a single component, any copolymer may also be used. Further, a mixture of 60% by weight or more of the polyester resin and 40% by weight or less of other thermoplastic polymer such as polycarbonate or ABS resin can also be used in the present invention.

In the polyphenylene ether resin (hereinafter referred to as "PPE") and/or polyphenylene sulfide resin (hereinafter referred to as "PPS"), the component (B), used for producing the fire retardant polyester resin composition of the present invention, the PPE is a homopolymer or copolymer having the structure represented by the following general formula (3):

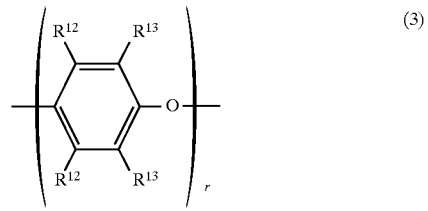

wherein $R^{12}$ represents hydrogen atom, a primary or secondary alkyl group, an aryl group, an aminoalkyl group or a hydrocarbon hydroxy group, $R^{13}$ represents a primary or secondary alkyl group, an aryl group or an aminoalkyl group, and r is an integer of 10 or more.

The primary alkyl group represented by $R^{12}$ or $R^{13}$ is methyl, ethyl, n-propyl, n-butyl, n-amyl, isoamyl, 2-methylbutyl, n-hexyl, 2,3-dimethylbutyl, 2,3- or 4-methylpentyl, or heptyl. Preferable examples of the secondary alkyl group represented by $R^{12}$ or $R^{13}$ include isopropyl, sec-butyl or 1-ethylpropyl. A suitable PPE homopolymer is, for instance, a polymer consisting of 2,6-dimethyl-1,4-phenylene ether unit. A suitable PPE copolymer is a random copolymer consisting of the above unit and 2,3,6-trimethyl-1,4-phenylene ether unit in combination.

The intrinsic viscosity of the PPE, the component (B), for use in the present invention, determined at 30° C. in chloroform is preferably 0.2 to 0.8 dl/g, more preferably 0.25 to 0.7 dl/g, particularly 0.3 to 0.6 dl/g. When a PPE having an intrinsic viscosity of less than 0.2 dl/g is used, the resulting composition is insufficient in impact resistance. On the other hand, a PPE having an intrinsic viscosity of more than 0.8 dl/g has a high gel content. Therefore, when such a PPE is used, the resulting molded product has a poor appearance.

A PPS can also be used as the component (B), and it is particularly preferable to use a PPS along with the PPE. The PPS for use in the present invention is a homopolymer or copolymer having the structure represented by the following general formula (4):

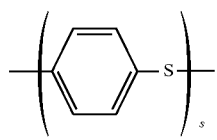

(4)

wherein s is an integer of 10 or more. The PPS homopolymer or copolymer contains the above repeating unit in an amount of 70 mol % or more, preferably 90 mol % or more, most preferably almost 100 mol %. The PPS copolymer may comprise, as the component copolymerized, metha, ether, sulfone or biphenyl linkage, amino-, carboxyl-, alkyl-, nitro-, phenyl- or alkoxy-substituted phenylsulfide linkage, or trifunctional phenylsulfide linkage as long as the amount of such a component is less than 30 mol %. The amount of the copolymerized component in the PPS copolymer is preferably less than 10 mol %, particularly less than 5 mol %.

In the case where the PPE and the PPS are used in combination, the weight ratio of the PPE to the PPS is 99:1 to 5:95, preferably 90:10 to 20:80, most preferably 70:30 to 30:70. When the proportion of the PPE is decreased to less than 5, the composition deteriorates in mechanical properties.

The component (B), the PPE and/or the PPS, is used in such an amount that the weight ratio of the component (A), the polyester resin, to the component (B) will be 95:5 to 30:70, preferably 90:10 to 40:60, particularly 80:20 to 60:40. When the proportion of the component (B) is less than 5, the resulting composition is insufficient in fire retardancy and resistance to hydrolysis. On the other hand, when the proportion of the component (B) is increased to more than 70, the composition considerably deteriorates in flow characteristics and molding properties.

The compatibilizing agent, the component (C), used for producing the fire retardant polyester resin composition of the present invention is a compound which can improve the dispersion properties of the PPE and/or the PPS in the polyester resin. It is possible to use, as such a compound, a polycarbonate resin, a compound having one or more carboxyl, carbonic ester, acid amide, imide, acid anhydride, epoxy, oxazolinyl, amino or hydroxyl groups, or a phosphorous ester compound. Specific examples of the compatibilizing agent include an epoxy-group-additioned PPE resin, a hydroxyalkylated PPE resin, a PPE resin having an oxazolinated end, polyester whose carboxyl end group is modified with polystyrene, polyester whose OH end group is modified with polyethylene, and phosphorous esters. Of these, phosphorous esters are preferred, and phosphorous triesters are more preferred from the viewpoints of the resistance to hydrolysis, crystallinity, mechanical properties and fire retardancy of the composition. In particular, phosphorous triesters which can be suitably used in the present invention are those ones which are represented by the following general formula (5):

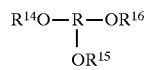

(5)

wherein $R^{14}$, $R^{15}$ and $R^{16}$ represent an alkyl group having 1 to 20 carbon atoms, or a substituted or unsubstituted aryl group having 6 to 30 carbon atoms, and may contain oxygen, nitrogen or sulfur atom; or the following general formula (6):

(6)

wherein u is 1 or 2, and $R^{17}$ and $R^{18}$ represent an alkyl group having 1 to 20 carbon atoms, or a substituted or unsubstituted aryl group having 6 to 30 carbon atoms, provided that $R^{17}$ may contain oxygen, nitrogen or sulfur atom.

Specific examples of the phosphorous triester represented by the general formula (5) include trioctyl phosphite, tridecyl phosphite, trilauryl phosphite, tristearyl phosphite, triisooctyl phosphite, tris(nonylphenyl) phosphite, tris(2,4-dinonylphenyl) phosphite, tris(2,4-di-tert-butylphenyl) phosphite, triphenyl phosphite, tris(octylphenyl) phosphite, diphenylisooctyl phosphite, diphenylisodecyl phosphite, octyldiphenyl phosphite, dilaurylphenyl phosphite, diisodecylphenyl phosphite, bis(nonylphenyl)phenyl phosphite and diisooctylphenyl phosphite.

Examples of $R^{17}$ in the general formula (6) include methyl, ethyl, propyl, octyl, isooctyl, isodecyl, decyl, stearyl, lauryl, phenyl, 2,3- or 4-methylphenyl, 2,4- or 2,6-dimethyl-phenyl, 2,3,6-trimethylphenyl, 2-, 3- or 4-ethylphenyl, 2,4- or 2,6-diethylphenyl, 2,3,6-triethylphenyl, 2-, 3- or 4-tert-butylphenyl, 2,4- or 2,6-di-tert-butylphenyl, 2,6-di-tert-butyl-6-methylphenyl, 2,6-di-tert-butyl-6-ethylphenyl, octylphenyl, isooctylphenyl, 2-, 3- or 4-nonylphenyl, 2,4-dinonylphenyl, biphenyl and naphthyl. Of these, substituted or unsubstituted aryl groups are preferred as $R^{17}$. In the case where u in the general formula (6) is 1, examples of $R^{18}$ include 1,2-phenylene group, and polymethylene groups such as ethylene, propylene, trimethylene, tetramethylene and hexamethylene.

Specific examples of the phosphorous triester represented by the general formula (6) in which u is 1 include (phenyl)(1,3-propanediol) phosphite, (4-methylphenyl)(1,3-propanediol) phosphite, (2,6-dimethylphenyl)(1,3-propanediol) phosphite, (4-tert-butylphenyl)(1,3-propanediol) phosphite, (2,4-di-tert-butylphenyl)(1,3-propanediol) phosphite, (2,6-di-tert-butylphenyl)(1,3-propanediol) phosphite, (2,6-di-tert-butyl-4-methylphenyl)(1,3-propanediol) phosphite, (phenyl)(1,2-ethanediol) phosphite, (4-methylphenyl)(1,2-ethanediol) phosphite, (2,6-dimethylphenyl)(1,2-ethanediol) phosphite, (4-tert-butylphenyl)(1,2-ethanediol) phosphite, (2,6-di-tert-butylphenyl)(1,2-ethanediol) phosphite, (2,6-di-tert-butyl-4-methylphenyl)(1,2-ethanediol) phosphite and (2,6-di-tert-butyl-4-methylphenyl)(1,4-butanediol) phosphite.

Further, when u in the general formula (6) is 2, $R^{18}$ is a tetrayl group having pentaerythrityl structure represented by the following general formula (7):

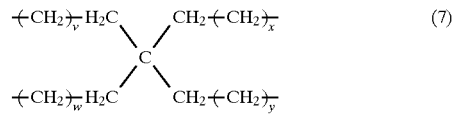

(7)

wherein v, w, x and y are an integer of 0 to 6.

Specific examples of the phosphorous triester represented by the general formula (6) in which u is 2 include diisodecylpentaerythritol diphosphite, dilaurylpentaerythritol diphosphite, distearylpentaerythritol diphosphite, diphenylpentaerythritol diphosphite, bis(2-methylphenyl)pentaerythritol diphosphite, bis(3-methylphenyl)pentaerythritol diphosphite, bis(4-methylphenyl)pentaerythritol diphosphite, bis(2,4-dimethylphenyl)pentaerythritol diphosphite, bis(2,6-dimethylphenyl)pentaerythritol diphosphite, bis(2,3,6-trimethylphenyl)pentaerythritol diphosphite, bis(2-tert-butylphenyl)pentaerythritol diphosphite, bis(3-tert-butylphenyl)pentaerythritol diphosphite, bis(4-tert-butylphenyl)pentaerythritol diphosphite, bis(2,4-di-tert-butylphenyl)pentaerythritol diphosphite, bis(2,6-di-tert-butylphenyl)pentaerythritol diphosphite, bis(2,6-di-tert-butyl-4-methyphenyl) pentaerythritol diphosphite, bis(2,6-di-tert-butyl-4-ethyphenyl)pentaerythritol diphosphite, bis(nonyl-phenyl) pentaerythritol diphosphite, bis(biphenyl)pentaerythritol diphosphite and dinaphthyl-pentaerythritol diphosphite.

Of these phosphorous triesters, those ones which are represented by the general formula (6) in which u is 1 or 2 are preferred, and those ones which are represented by the general formula (6) in which u is 2 and $R^{18}$ is a tetrayl group having pentaerythrityl structure represented by the general formula (7) are more preferred. Of these preferable phosphorous triesters, bis(nonylphenyl)-pentaerythritol diphosphite, bis(2,4-di-tert-butylphenyl)pentaerythritol diphosphite and bis(2,6-di-tert-butyl-4-methylphenyl) pentaerythritol diphosphite are more preferred. In particular, bis(2,4-di-tert-butylphenyl)pentaerythritol diphosphite and bis(2,6-di-tert-butyl-4-methylphenyl)pentaerythritol diphosphite are suitably used in the present invention.

It is noted that the composition of the present invention may comprise a compound which is produced by the decomposition (hydrolysis, thermal decomposition, etc.) of any of these phosphorous triesters.

The compatibilizing agent, the component (C), is used in an amount of 0.05 to 10 parts by weight, preferably 0.1 to 8.0 parts by weight, particularly 0.3 to 5.0 parts by weight for 100 parts by weight in total of the components (A) and (B). When the amount of the component (C) is decreased to less than 0.05 parts by weight, the composition deteriorates in physical properties, especially in mechanical properties and fire retardancy. On the other hand, when more than 10 parts by weight of the component (C) is used, the resulting composition has lowered fire retardancy, and the final product has a poor appearance.

Specific examples of the phosphoric ester compound, the component (D), used for producing the fire retardant polyester resin composition of the present invention include trimethyl phosphate, triethyl phosphate, tributyl phosphate, trioctyl phosphate, tributoxyethyl phosphate, triphenyl phosphate, tricresyl phosphate, cresyldiphenyl phosphate and octyldiphenyl phosphate. Of these, those compounds which are represented by the following general formula (1) are preferred:

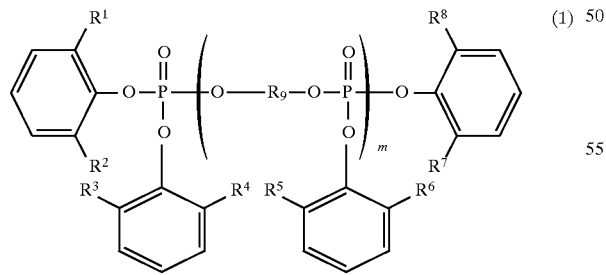

In the above formula (1), $R^1$ to R8 represent hydrogen atom, or an alkyl group having 1 to 6 carbon atoms. In order to impart improved resistance to hydrolysis to the composition, it is preferable that $R^1$ to $R^8$ be an alkyl group having not more than 6 carbon atoms, more preferably an alkyl group having not more than 2 carbon atoms, especially methyl group. m is 0 or an integer of 1 to 4, preferably an integer of 1 to 3, especially 1. $R^9$ represents a structure selected from the following:

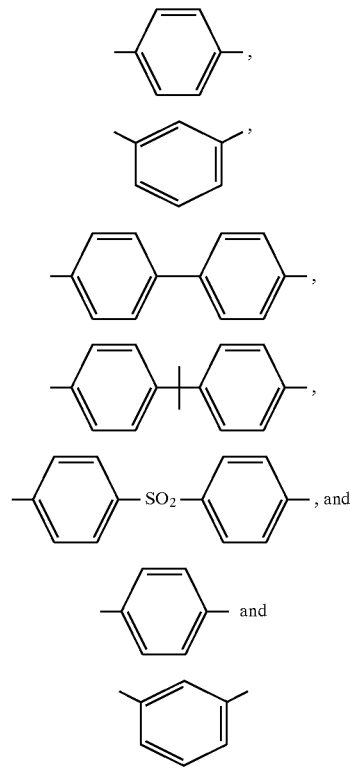

are preferred, and

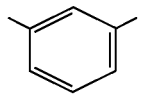

is particularly preferred.

A phosphonitrile compound having a group represented by the following general formula (2) can also be suitably used as the component (D):

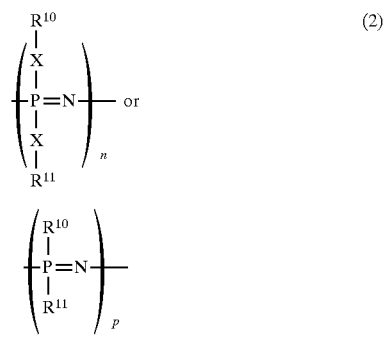

wherein X represents O, S, or N-H, $R^{10}$ and $R^{11}$ are an aryl, alkyl or cycloalkyl group having 1 to 20 carbon atoms, -X-$R^{10}$ and -X-$R^{11}$ may be same or different, and n and p are an integer of 1 to 12.

In the above formula (2), $R^{10}$ and $R^{11}$ are an aryl, alkyl or cycloalkyl group having 1 to 20 carbon atoms. Specific examples of these groups include methyl, ethyl, butyl, hexyl, cyclohexyl, phenyl, benzyl and naphthyl. n and p are an integer of 1 to 12; they are usually an integer of 3 to 10, and an integer of 3 or 4 is particularly preferred. The phosphonitrile compound may be either a linear polymer or a cyclic polymer, and a cyclic polymer is suitably used in the present invention. In the above formula (2), X represents O, S, or N-H. Of these, 0 and N-H are preferred, and 0 is particularly preferred.

The component (D) is used in an amount of 2.0 to 45 parts by weight, preferably 3.0 to 40 parts by weight, particularly 5.0 to 30 parts by weight for 100 parts by weight in total of the components (A) and (B). When less than 2.0 parts by weight of the component (D) is used, the resulting composition is insufficient in fire retardancy. When the amount of the component (D) is increased to more than 45 parts by weight, the composition considerably deteriorates in mechanical properties, resistance to hydrolysis and molding properties.

The reinforcing filler, the component (E), used for producing the fire retardant polyester resin composition of the present invention may be either an organic compound or an inorganic compound. Examples of the reinforcing filler include glass fiber, glass flake, glass bead, milled fiber, alumina fiber, silicon carbide fiber, boron fiber, carbon fiber, aramid fiber, and whiskers of alumina, silicon oxide, magnesium oxide, aluminum oxide, zirconium oxide, titanium oxide, carbonates such as calcium carbonate, magnesium carbonate and dolomite, calcium sulfate, barium sulfate, zirconium phosphate, boron nitride, silicon carbide and potassium titanate. The mean aspect ratio of the reinforcing filler, the component (E), after it is incorporated into the polyester resin composition is preferably 3.0 or more, more preferably 5.0 or more, most preferably 10 or more.

The above-enumerated materials are used either singly or in combination of two or more as the reinforcing filler, the component (E). In general, it is preferable to treat, in advance, the materials with a silane or titanium coupling agent, or the like. Further, in order to increase the adhesion between the coupling agent and the polyester resin composition, an acid anhydride such as maleic anhydride may be added, and, at the same time, an organic peroxide may also be added to further increase the adhesion. The reinforcing filler, the component (E), is used in an amount of 0 to 150 parts by weight, preferably 10 to 140 parts by weight, more preferably 20 to 130 parts by weight for 100 parts by weight in total of the components (A) and (B). When the amount of the component (E) is increased to more than 150 parts by weight, the composition considerably deteriorates in flow characteristics.

The anti-dripping agent, the component (F), used for producing the polyester resin composition of the present invention is a compound having the properties of preventing a resin from dripping while the resin is burning. Specific examples of the anti-dripping agent include silicone oils, silica, asbestos, fluorine-containing polymers, and layered silicates such as talc and mica. Of these, fluorine-containing polymers, silicone oils and layered silicates are preferable as the anti-dripping agent when the fire retardancy of the composition is taken into consideration.

Examples of the fluorine-containing polymers include fluorinated polyolefins such as polytetrafluoroethylene, tetrafluoroethylene/perfluoroalkylvinyl ether copolymers, tetrafluoroethylene/hexafluoropropylene copolymers, tetrafluoroethylene/ethylene copolymers, vinylidene fluoride and polychlorotrifluoroethylene. Of these, polytetrafluoroethylene, tetrafluoroethylene/perfluoroalkylvinyl ether copolymers, tetrafluoroethylene/hexafluoropropylene copolymers and tetrafluoroethylene/ethylene copolymers are more preferred, and polytetrafluoroethylene and tetrafluoroethylene/hexafluoropropylene copolymers are particularly preferred.

Further, the melt viscosity at 350° C. of the fluorine-containing polymer for use in the present invention is preferably $1.0 \times 10^3$ to $1.0 \times 10^{16}$ poises, more preferably $1.0 \times 10^4$ to $1.0 \times 10^{15}$ poises, particularly $1.0 \times 10^{11}$ to $1.0 \times 10^{13}$ poises. When a fluorine-containing polymer having a melt viscosity of lower than $1.0 \times 10^3$ poises is used, there is a tendency that the resulting composition cannot show sufficiently high resistance to dripping while it is burning. On the other hand, when a fluorine-containing polymer having a melt viscosity of higher than $1.0 \times 10^{16}$ poises is used, the resulting composition tends to be poor in flow characteristics.

The silicone oil used as the component (F) is a compound having dimethyl polysiloxane skeleton represented by the following general formula (8):

wherein t is an integer of 3 or more. A part of or all of the terminal ends or side chains of such a compound may be substituted with functional groups by undergoing amino-, epoxy-, carboxyl-, carbinol-, methacryl-, mercapto-, phenol-, polyether-, methylstyryl-, alkyl-, higher-fatty-ester-, higher-alkoxy- or fluoro-modification.

The viscosity at 25° C. of the silicone oil for use in the present invention is preferably 1,000 to 30,000 cst, more preferably 2,000 to 25,000 cst, particularly 3,000 to 20,000 cst. When a silicone oil having a viscosity of lower than 1,000 cst is used, the resulting composition cannot show sufficiently high resistance to dripping while it is burning, and thus tends to have lowered fire retardancy. On the other hand, when a silicone oil having a viscosity of higher than 30,000 cst is used, the resulting composition has an increased viscosity, and thus tends to be poor in flow characteristics.

It is more preferable to use a layered silicate as the anti-dripping agent, the component (F), in the fire retardant polyester resin composition of the present invention from the viewpoint of the melt-flow characteristics of the composition. Examples of the layered silicate include layered silicates, modified layered silicates (layered silicates containing quaternary organic onium cation charged between their layers), and layered silicates or modified layered silicates additioned with a reactive functional group. Of these, modified layered silicates, and layered silicates or modified layered silicates additioned with a reactive functional group are preferred when the dispersion properties of the layered silicates in the polyester resin composition and the anti-dripping properties are taken into consideration. In particular, layered silicates or modified layered silicates additioned with a reactive functional group such as epoxy, amino, oxazoline, carboxyl or acid anhydride group can be suitably used in the present invention. There is no particular limitation on the method for preparing the layered silicates or modified layered silicates additioned with such a reactive functional group. However, a method in which a functionality-imparting agent (silane coupling agent) is used to treat a layered silicate or modified layered silicate is simple and preferred.

Specific examples of the silane coupling agent include chlorosilanes having epoxy group such as 3-glycidyloxypropyl-dimethylchlorosilane, beta-(3,4- epoxycyclohexyl)ethyldimethyl-chlorosilane and 3-glycidyloxypropyltrichlorosilane, chlorosilanes having carboxyl group such as trichlorosilyl-acetic acid, 3-trichlorosilylpropionic acid and 5-carboxyhexyl-dimethylchlorosilane, chlorosilanes having mercapto group such as 3-mercaptopropyl-dimethyltrichlorosilane, 3-mercaptopropyl-trichlorosilane and 4-mercaptophenyl-dimethylchlorosilane, alkoxysilanes having amino group such as 3-aminopropyltri-ethoxysilane, N-(2-aminoethyl)-3-aminopropyltrimethoxysilane and N-(2-aminoethyl)-3-aminopropylmethyldimethoxysilane, and alkoxysilanes having epoxy group such as 3-glycidyloxypropyl-methyldiethoxy-silane, 3-glycidyloxypropyl-trimethoxysilane and beta- (3,4-epoxycyclohexyl) ethyltrimethoxysilane. Of these, chlorosilanes having epoxy group such as 3-glycidyloxypropyl-dimethylchlorosilane, beta-(3,4-epoxycyclohexyl)ethyldimethyl-chlorosilane and 3-glycidyloxypropyltrichlorosilane, alkoxysilanes having amino group such as 3-aminopropyltri-ethoxysilane, N-(2-aminoethyl)-3-aminopropyltrimethoxysilane and N-(2-aminoethyl)-3-aminopropylmethyldimethoxysilane, and alkoxysilanes having epoxy group such as 3-glycidyloxypropylmethyldiethoxysilane, 3-glycidyloxypropyltrimethoxysilane and beta-(3,4-epoxycyclohexyl)ethyltrimethoxysilane are preferred, and chlorosilanes having epoxy group such as 3-glycidyloxy-propyldimethylchlorosilane, beta-(3,4-epoxycyclohexyl)-ethyl-dimethylchlorosilane and 3-glycidyloxypropyl-trichlorosilane, and alkoxysilanes having epoxy group such as 3-glycidyloxy-propylmethyldiethoxysilane, 3-glycidyloxypropyltrimethoxysilane and beta-(3,4-epoxycyclohexyl)ethyltrimethoxysilane are more preferred. In particular, alkoxysilanes having epoxy group such as 3-glycidyloxypropylmethyldiethoxysilane, 3-glycidyl-oxypropyltrimethoxysilane and beta-(3,4-epoxycyclohexyl) -ethyl-trimethoxysilane are suitably used in the present invention. There is no particular limitation on the method for bringing the functionality-imparting agent into contact with a layered silicate. It is however preferable to attain this contact by mixing the functionality-imparting agent with the layered silicate without using a solvent or in a polar solvent.

Specific examples of the layered silicates which can be used in the present invention include smectite clay minerals such as montmorillonite, hectorite, fluorine hectorite, saponite, beidellite and subtincite, swelling synthetic micas such as Li-type fluorine taeniolite, Na-type fluorine taeniolite, Na-type tetrasilicon fluorine mica and Li-type tetrasilicon fluorine mica, vermiculite, fluorine vermiculite and halloysite. Thus, the layered silicates may be either natural or synthetic ones.

Of these, smectite clay minerals such as montomorillonite and hectorite, and swelling synthetic micas such as Li-type fluorine taeniolite, Na-type fluorine taeniolite and Na-type teterasilicon fluorine mica are preferred, and montmorillonite and Na-type fluorine taeniolite are particularly preferred. These layered silicates can be used singly or in combination.

There is no particular limitation on the quaternary onium cation which is charged between the layers of the modified layered silicate for use in the present invention. Specific examples of the quaternary onium cation which can be suitably used include trimethylakyl ammoniums such as trimethyloctyl ammonium, trimethyldecyl ammonium, trimethyldodecyl ammonium, trimethyltetradecyl ammonium, trimethylhexadecyl ammonium and trimethyloctadecyl ammonium, and dimethyldialkyl ammoniums such as dimethyldioctyl ammonium, dimethyldidecyl ammonium, dimethyldidodecyl ammonium, dimethylditetradecyl ammonium, dimethyldihexadecyl ammonium and dimethyldioctadecyl ammonium.

The amount of the anti-dripping agent, the component (F), in the polyester resin composition of the invention is from 0.001 to 15 parts by weight for 100 parts by weight in total of the components (A) and (B). When the component (F) is used in an amount of less than 0.001 parts by weight, the resulting composition is insufficient in anti-dripping properties. When the amount of the component (F) is increased to more than 15 parts by weight, the composition drastically deteriorates in flow characteristics and mechanical properties.

In the case where the above-described fluorine-containing polymer or silicone oil is used as the anti-dripping agent, the component (F), the amount of such a material is generally 0.001 to 10 parts by weight, preferably 0.005 to 8 parts by weight, particularly 0.01 to 5.0 parts by weight for 100 parts by weight in total of the components (A) and (B). When the above-described layered silicate is used as the anti-dripping agent, the component (F), the amount of such a material is generally 0.1 to 15 parts by weight, preferably 0.3 to 12 parts by weight, particularly 0.5 to 10 parts by weight for 100 parts by weight in total of the components (A) and (B).

The melamine cyanurate, the component (G), used for producing the polyester resin composition of the present invention is a product of an equimolar reaction between cyanuric acid and melamine. For instance, the melamine cyanurate can be obtained by mixing an aqueous solution of cyanuric acid with an aqueous solution of melamine, agitating the mixture at 90° C. to 100° C. to allow the cyanuric acid and the melamine to react with each other, and separating the precipitate produced by means of filtration. The particle size of the melamine cyanurate is from 0.01 to 1,000 micrometers, preferably from 0.01 to 500 micrometers. Some of the amino or hydroxyl groups in the melamine cyanurate may be substituted with other substituents. The melamine cyanurate is used in an amount of 0 to 45 parts by weight, preferably 3.0 to 40 parts by weight, particularly 5.0 to 30 parts by weight for 100 parts by weight in total of the components (A) and (B). In particular, when the amount of the component (B) is less than 35 parts by weight, the melamine cyanurate is used in an amount of 0.5 to 45 parts by weight. When the melamine cyanurate is used in an amount of less than 0.5 parts by weight, the resulting composition cannot have sufficiently high fire retardancy. On the other hand, when the melamine cyanurate is used in an amount of more than 45 parts by weight, the resulting composition is poor in toughness and ductility, and also suffers from the bleed-out or plate-out of the melamine cyanurate.

There is no particular limitation on the ratio of the component (D) to the component (G), the melamine cyanurate. However, this ratio is generally 1.0:9.0 to 9.0:1.0, preferably 1.5:8.5 to 8.5:1.5, particularly 2.0:8.0 to 8.0:2.0.

On the other hand, when more than 35 parts by weight of the component (B) is used, it is not necessary to incorporate the melamine cyanurate so as to impart high fire retardancy to the polyester resin composition.

Examples of the polystyrene resin having epoxy group, the component (H), for use in the polyester resin composition of the invention include polymer compounds obtained by block- or graft-copolymerizing styrene and a polymer which is obtained by polymerizing a copolymerizable unsaturated monomer having epoxy group such as glycidyl methacrylate or acrylate, vinylglycidyl or allylglycidyl ether, glycidyl ether of hydroxyalkyl (meth)acrylate or of polyalkylene glycol (meth)acrylate, or glycidyl itaconate, comb-shaped polystyrene additioned with epoxy group, and polystyrene additioned with epoxy group.

There is no particular limitation on the structure of the polystyrene resin having epoxy group, and specific examples of such a polystyrene resin include the following compounds: a comb-shaped polymer compound containing, as its main chain, a polymer obtained by polymerizing a copolymerizable unsaturated monomer having epoxy group, and, as its side chain, polystyrene; a straight-chain polymer compound obtained by block-copolymerizing polystyrene and a polymer which is obtained by polymerizing a copolymerizable unsaturated monomer having epoxy group; a comb-shaped polymer compound containing polystyrene as its main. chain, and, as its side chain, a polymer which is obtained by polymerizing a copolymerizable unsaturated monomer having epoxy group; a comb-shaped polymer compound containing, as its main chain, polystyrene having epoxy group, and, as its side chain, polystyrene; and polystyrene additioned with a small number of epoxy groups. Of these, a comb-shaped polymer compound containing, as its main chain, a polymer obtained by polymerizing a copolymerizable unsaturated monomer having epoxy group, and, as its side chain, polystyrene; a comb-shaped polymer compound containing, as its main chain, polystyrene having epoxy group, and, as its side chain, polystyrene; and modified polystyrene additioned with a small number of epoxy groups are preferred. A comb-shaped polymer compound containing, as its main chain, a polymer obtained by polymerizing a copolymerizable unsaturated monomer having epoxy group, and, as its side chain, polystyrene is particularly preferred. These polystyrene resins having epoxy group can be used either singly or as a mixture of two or more.

The weight-average molecular weight of the polystyrene in the polystyrene resin having epoxy group, the component (H), is generally 3,000 to 500,000, preferably 5,000 to 300,000, more preferably 20,000 to 200,000. When the weight-average molecular weight of the polystyrene is made to less than 3,000 or more than 500,000, the composition tends to deteriorate in impact resistance and flow characteristics. The polystyrene resin having epoxy group, the component (H), is used in an amount of 0 to 15 parts by weight, preferably not more than 12 parts by weight, particularly not more than 10 parts by weight for 100 parts by weight in total of the components (A) and (B). It is unfavorable to use more than 15 parts by weight of the polystyrene resin having epoxy group because the resulting composition may have extremely lowered fire retardancy.

The fire retardant polyester resin composition of the present invention can be obtained by mixing the above-described components, for instance, by a dry blending method in which the components are mixed by using a blender or mixer, or by a melt kneading method in which the components are melt-kneaded by using an extruder. A suitable method is such that, after the components are melt-kneaded and extruded into strand by a screw extruder, the strand is made into pellet. In this case, a method in which the three components of the polyester resin (component (A)), the PPE and/or PPS (component (B)) and the compatibilizing agent (component (C)) are firstly melt-kneaded to form a mixture, and the mixture is then mixed with the other components (D) to (H) to obtain the desired polyester resin composition is more preferable than a method in which all of the components (A) to (H) are melt-kneaded at the same time from the viewpoint of the flexural properties (flexural modulus and flexural strength) of the resulting composition.

It is particularly preferable to add, when the components (A), (B) and (C) are mixed, a solvent in which the component (B) can be dissolved. Examples of such a solvent include xylene, toluene, trichlorobenzene, chloroform and a-chloronaphthalene. Of these, xylene and toluene are preferred, and xylene is particularly preferred from the viewpoints of the prevention of emission of corrosive gases and of the easiness of desolvation. The fire retardant polyester resin composition of the present invention can comprise other conventional additives such as light stabilizers, ultraviolet absorbers, antioxidants, antistatic agents, adhesion accelerators, crystallization accelerators, lubricants, coloring agents, foaming agents, plasticizers, thickening agents, drip-proofing agents, releasing agents, impact-resistance-improving agents and anti-smoking agents. The polyester resin composition can be molded by various molding methods such as injection, extrusion or compression molding method. Further, in order to improve the flow characteristics of the fire retardant polyester resin composition of the present invention, a polystyrene resin can also be added to the composition within such a range that the fire retardancy and mechanical properties of the composition will not be marred.

The fire retardant polyester resin composition according to the present invention is excellent in fire retardancy, mechanical properties and resistance to hydrolysis. In addition, the composition evolves no corrosive gases, so that it does not corrode a metal mold when it is molded. Moreover, the composition has a low specific gravity, and is excellent in flow characteristics. Therefore, the composition of the present invention can be suitably used for producing molded products which are thin-walled or complicated in shape. The polyester resin composition of the present invention is thus suitable as a material used for producing electrical or electronic equipments and parts thereof.

EXAMPLES

The present invention will now be explained more specifically by referring to the following examples. However, the present invention is not limited by these examples in any way.

Throughout the examples, the unit "part(s)" means "part (s) by weight".

The polyester resin compositions obtained in the following Examples and Comparative Examples were evaluated in terms of the following properties.
1) Fire Retardancy
The UL (Underwriter's Laboratories Inc.) 94 standard vertical flame test was carried out, and the limiting oxygen index ("LOI": ASTM D-2863, JIS K7201) was also determined to evaluate the fire retardancy.
2) Crystallization Temperature (Tc) of Polymer
Under nitrogen atmosphere, a sample (approximately 10 mg) was heated to a temperature of 260° C. at a heating rate of 16° C./min, kept at the temperature for 5 minutes, and then cooled to 30° C. at a cooling rate of 16° C./min by using a DSC (TA-2000) manufactured by Du Pont Inc., whereby the freezing point of the polymer was determined.
3) Flexural Properties
A bending test was carried out in accordance with ASTM D-790, and the flexural modulus ($kgf/cm^2$) and flexural strength ($kgf/cm^2$) were measured.
4) Impact Resistance
In accordance with ASTM D-256, a notched Izod impact test (abbreviated to "IZOD", unit kg.cm/cm) was carried out by using a notched specimen having a thickness of ⅛ inches.
5) Resistance to Hydrolysis After a specimen was exposed to water vapor at 120° C. for 24 hours, the above-described tensile test was carried out, and the retention of the tensile strength was obtained by the following equation:

Retention (%) = (Tensile strength after the exposure to water vapor)/(Tensile strength before the exposure to water vapor) × 100

6) Plate-Out

The surface of the metal mold used was visually observed.

7) Release Properties

A lattice specimen of 100 mm×100 mm was made by injection molding. The cylinder temperature was 270° C., the mold temperature was 80° C., and the cooling time was 10 seconds. The pressure acted upon the center of the molded product when it was released from the metal mold by the aid of an ejector pin assembly was measured by a pressure sensor attached to the ejector pin assembly.

8) Flow Characteristics

The melt viscosity was measured at 260° C. by using a "Shimadzu Flow Tester CFT 500" (nozzle: 1 mm (diameter) ×10 mm).

In Examples 1 to 30 and Comparative Examples 1 to 17, the following materials were used;

(a) polybutylene terephthalate having an intrinsic viscosity of 0.85, manufactured by Mitsubishi Engineering-Plastics Corp. (trade name "Novadur", hereinafter referred to as "PBT");

(b) PPE having an intrinsic viscosity of 0.45, manufactured by Mitsubishi Engineering-Plastics Corp. (trade name "Iupiace");

(c) bis(2,6-di-tert-butyl-4-methylphenyl)-pentaerythritol diphosphite manufactured by Adeka Co., Ltd. (trade name "MARK PEP 36");

(d) melamine cyanurate manufactured by Mitsubishi Engineering-Plastics Corp.;

(e) glass fiber (3 mm chopped strand treated with epoxy silane) manufactured by Nippon Electric Glass Co., Ltd.;

(f) milled fiber (a product treated with epoxy silane) manufactured by Nippon Electric Glass Co., Ltd.;

(g) swelling synthetic mica manufactured by Co-op Chemical Co., Ltd. (trade name "ME 100");

(h) organo-modified "ME 100" (example of modification: dimethyldistearyl ammonium);

(i) epoxy-silane-treated "ME 100" ("ME 100" additioned with epoxy group);

(j) epoxy-silane-treated organo-modified "ME 100" (organo-modified "ME 100" additioned with epoxy group);

(k) polycarbonate having an intrinsic viscosity of 0.36, manufactured by Mitsubishi Engineering-Plastics Corp. (trade name "Novarex", hereinafter referred to as "PC");

(l) liquid crystalline polyester manufactured by Mitsubishi Engineering-Plastics Corp. (trade name "Novacurate E 321", hereinafter referred to as "LCP");

(m) polyethylene terephthlate having an intrinsic viscosity of 0.65, manufactured by Mitsubishi Chemical Corp. (trade name "Novapex", hereinafter referred to as "PET");

(n) polystyrene having a melt flow index (at 200° C. under a load of 5 kg) of 5.5 g/10 min, manufactured by Mitsubishi Chemical Corp. (trade name "Diarex", hereinafter referred to as "PSt");

(o) polytetrafluoroethylene (ethylene tetrafluoride resin), manufactured by Daikin Industries, Ltd. (trade name "Polyfron F 201");

(p) silicone oil having a high viscosity of 7,500 cs, manufactured by Shin-Etsu Silicone Co., Ltd. (trade name "KF-102");

(q) "Modiper A 4100" manufactured by Nippon Oil & Fat Co., Ltd. (a comb-shaped polymer obtained by grafting polystyrene to ethylene-glycidyl methacrylate copolymer, abbreviated to "EGMA-g-PSt" (weight % ratio of EGMA/PSt=70/30);

(r) "Rezeda GP 500" manufactured by Toagosei Chemical Industry Co., Ltd. (a comb-shaped polymer obtained by grafting polystyrene to epoxy-modified polystyrene, abbreviated to "(Epo-PSt)-g-PSt"); and (s) epoxy-modified polystyrene (3.0 parts by weight of glycidyl methacrylate and 0.015 parts by weight of 2,5-dimethyl-2,5-di-(t-butylperoxy)hexine-3 were mixed with 100 parts by weight of polystyrene having a melt flow rate of 5.5 g/10 min, and the mixture was kneaded at a temperature of 210° C. by using a twin-screw extruder having a diameter of 30 mm and then pelletized. After unreacted glycidyl methacrylate was acetone-extracted, the amount of the glycidyl methacrylate was determined from the ultra-violet absorption spectra. As a result, it was found that 1.7% by weight of the glycidyl methacrylate had been reacted).

Example 1

80 parts of the PBT, 20 parts of the PPE and 1.0 part of "MARK PEP 36" were blended. By using a bent-type twin-screw extruder ("Twin-Screw Extruder Labo TEX 30" manufactured by The Japan Steel Works, Ltd.) having a diameter of 30 mm, the mixture was melt-kneaded at a barrel temperature of 270° C., and extruded into strand. The strand was then pelletized by a strand cutter. The pellet thus obtained was dried, and then melt-kneaded with a dry blend consisting of, for 100 parts of the pellet, 15 parts of a phosphoric ester compound having the following structural formula (10):

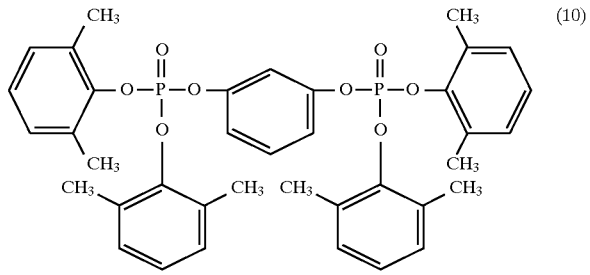

15 parts of the melamine cyanurate, 60 parts of the glass chopped strand and 2.0 parts of the epoxy-silane-treated "ME 100". The mixture was extruded into strand, and the strand was then pelletized by a strand cutter. The pellet obtained was molded into specimens by using an injection molding machine (type "J 28 SA" manufactured by The Japan Steel Works, Ltd.) and a metal mold for producing specimens for use in the UL 94 standard burning test or for producing specimens used for the determination of LOI (limiting oxygen index). The molding was carried out at a cylinder temperature of 270° C. and a mold temperature of 80° C. By the use of the specimens, the evaluations were conducted.

Example 2

The procedure of Example 1 was repeated except that the amounts of the PBT and the PPE were changed to 90 parts and 10 parts, respectively.

Example 3

The procedure of Example 1 was repeated except that the amounts of the PBT and the PPE were changed to 60 parts and 40 parts, respectively.

Example 4

The procedure of Example 1 was repeated except that the amounts of the PBT and the PPE were changed to 50 parts and 50 parts, respectively.

Example 5

The procedure of Example 4 was repeated except that the amount of the phosphoric ester compound having the structural formula (10) was changed to 30 parts and that the melamine cyanurate was not used.

Example 6

The procedure of Example 1 was repeated except that the amounts of the PBT and the PPE were changed to 40 parts and 60 parts, respectively.

Example 7

The procedure of Example 6 was repeated except that the amount of the glass chopped strand was changed to 65 parts and that the PSt was used in an amount of 10 parts.

Example 8

The procedure of Example 1 was repeated except that the glass chopped strand was not used.

Example 9

The procedure of Example 1 was repeated except that the amount of the glass chopped strand was changed to 20 parts.

Example 10

The procedure of Example 1 was repeated except that the amount of the glass chopped strand was changed to 100 parts.

Example 11

The procedure of Example 1 was repeated except that the amount of the milled fiber was changed to 60 parts.

Example 12

The procedure of Example 1 was repeated except that 2.0 parts of the organo-modified "ME 100" was used instead of 2.0 parts of the epoxy-silane-treated "ME 100".

Example 13

The procedure of Example 1 was repeated except that 2.0 parts of the epoxy-silane-treated organo-modified "ME 100" was used instead of 2.0 parts of the epoxy-silane-treated "ME 100".

Example 14

The procedure of Example 1 was repeated except that the amounts of the phosphoric ester compound having the structural formula (10) and the melamine cyanurate were changed to 7.5 parts and 22.5 parts, respectively.

Example 15

The procedure of Example 3 was repeated except that the amounts of the phosphoric ester compound having the structural formula (10) and the melamine cyanurate were changed to 22.5 parts and 7.5 parts, respectively.

Example 16

The procedure of Example 1 was repeated except that the amounts of the phosphoric ester compound having the structural formula (10) and the melamine cyanurate were changed to 10 parts and 10 parts, respectively.

Example 17

The procedure of Example 1 was repeated except that 0.05 parts of the polytetrafluoroethylene was used instead of 2.0 parts of the epoxy-silane-treated "ME 100".

Example 18

The procedure of Example 1 was repeated except that 1.0 part of the silicone oil was used instead of 2.0 parts of the epoxy-silane-treated "ME 100".

Example 19

The procedure of Example 1 was repeated except that 15 parts of a phosphoric ester compound having the following structural formula (11):

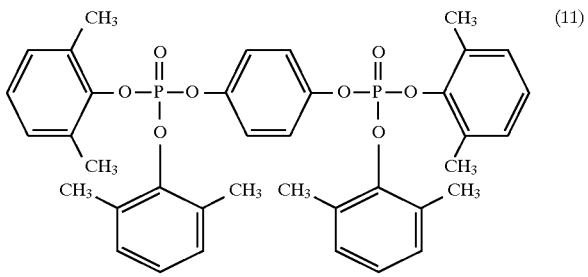

was used instead of 15 parts of the phosphoric ester compound having the structural formula (10).

Example 20

The procedure of Example 1 was. repeated except that 15 parts of a phosphoric ester compound having the following structural formula (12):

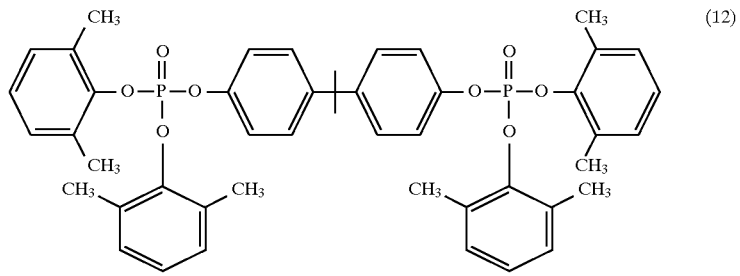

was used instead of 15 parts of the phosphoric ester compound having the structural formula (10).

Example 21

The procedure of Example 1 was repeated except that 30 parts of a phosphonitrile compound having the following structural formula (13):

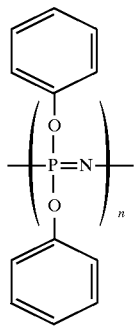

(13)

wherein n is 3 or 4, was used instead of 15 parts of the phosphoric ester compound having the structural formula (10) and 15 parts of the melamine cyanurate.

Example 22

The procedure of Example 1 was repeated except that 15 parts of a phosphoric ester compound having the following structural formula (14):

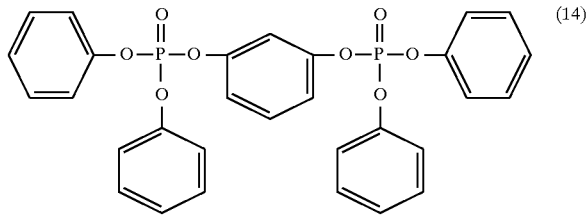

(14)

was used instead of 15 parts of the phosphoric ester compound having the structural formula (10).

Example 23

The procedure of Example 1 was repeated except that 80 parts of the PET was used instead of 80 parts of the PBT.

Example 24

The procedure of Example 1 was repeated except that the amount of the PPE was changed to 15 parts and that the PPS was also used in an amount of 5.0 parts.

Example 25

The procedure of Example 1 was repeated except that the amount of the PPE was changed to 5.0 parts and that the PPS was also used in an amount of 15 parts.

Example 26

The procedure of Example 1 was repeated except that 3.0 parts of xylene was added when the first kneading was conducted.

Example 27

The procedure of Example 1 was repeated except that 5.0 parts of an epoxy-group-additioned PPE having the following structural formula (15):

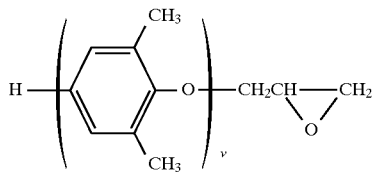

(15)

was used instead of 1.0 part of the compatibilizing agent "MARK PEP 36" and that the amount of the PPE was changed to 15 parts.

Example 28

80 parts of the PBT, 20 parts of the PPE and 1.0 part of "MARK PEP 36" were blended. By using a bent-type twin-screw extruder ("Twin-Screw Extruder Labo TEX 30" manufactured by The Japan Steel Works, Ltd.) having a diameter of 30 mm, the mixture was melt-kneaded at a barrel temperature of 270° C., and extruded into strand. The strand was then pelletized by a strand cutter. The pellet thus obtained was dried, and then melt-kneaded with a dry blend consisting of, for 100 parts of the pellet, 15 parts of a phosphoric ester compound having the above-described structural formula (10), 15 parts of the melamine cyanurate, 60 parts of the glass chopped strand, 2.0 parts of the epoxy-silane-treated "ME 100", and 4.0 parts of "Modiper A 4100". The mixture was extruded into strand, and the strand was then pelletized by a strand cutter. The pellet obtained was molded into specimens by using an injection molding machine (type "J 28 SA" manufactured by The Japan Steel Works, Ltd.) and a metal mold for producing specimens for use in the UL 94 standard burning test or for producing specimens used for the determination of LOI (limiting oxygen index) or for producing specimens for use in the ASTM test. The molding was carried out at a cylinder temperature of 270° C. and a mold temperature of 80° C. By the use of the specimens, the evaluations were conducted.

Example 29

The procedure of Example 28 was repeated except that 4.0 parts of "Rezeda GP 500" was used instead of 4.0 parts of "Modiper A 4100".

Example 30

The procedure of Example 28 was repeated except that 4.0 parts of the epoxy-modified polystyrene (s) was used instead of 4.0 parts of "Modiper A 4100".

Comparative Example 1

The procedure of Example 1 was repeated except that the amount of the PBT was changed to 100 parts and that the PPE was not used. The composition remarkably deteriorated in fire retardancy and resistance to hydrolysis.

Comparative Example 2

The procedure of Example 1 was repeated except that the "MARK PEP 36" was not used. The composition remarkably deteriorated in fire retardancy, mechanical properties and resistance to hydrolysis.

Comparative Example 3

The procedure of Example 1 was repeated except that the amounts of the PBT and the PPE were changed to 60 parts and 40 parts, respectively, and that the "MARK PEP 36" was not used. The composition considerably deteriorated in fire retardancy, mechanical properties and resistance to hydrolysis.

Comparative Example 4

The procedure of Example 1 was repeated except that the amounts of the PBT and the PPE were changed to 98 parts and 2.0 parts, respectively. The composition remarkably deteriorated in fire retardancy and resistance to hydrolysis.

Comparative Example 5

The procedure of Example 1 was repeated except that the amounts of the PBT and the PPE were changed to 10 parts and 90 parts, respectively. The resulting composition had a greatly increased melt viscosity.

Comparative Example 6

The procedure of Example 1 was repeated except that the amount of the phosphoric ester compound having the structural formula (10) was changed to 30 parts and that the melamine cyanurate was not used. The composition deteriorated in fire retardancy and mechanical properties.

Comparative Example 7

The procedure of Example 1 was repeated except that the phosphoric ester compound having the structural formula (10) was not used and that the amount of the melamine cyanurate was changed to 30 parts. The composition considerably deteriorated in fire retardancy.

Comparative Example 8

The procedure of Example 1 was repeated except that the amounts of the phosphoric ester compound having the structural formula (10), the melamine cyanurate and the glass chopped strand were changed to 60 parts, 60 parts and 90 parts, respectively. The composition considerably deteriorated in resistance to hydrolysis, and showed greatly increased resistance to mold release. In addition, plate-out was also observed.

Comparative Example 9

The procedure of Example 1 was repeated except that the amounts of the phosphoric ester compound having the structural formula (10), the melamine cyanurate and the glass chopped strand were changed to 1.0 part, 1.0 part and 50 parts, respectively. The composition remarkably deteriorated in fire retardancy.

Comparative Example 10

The procedure of Example 1 was repeated except that the amount of the glass chopped strand was changed to 180 parts. The resulting composition had an extremely increased melt viscosity, and showed greatly increased resistance to mold release.

Comparative Example 11

The procedure of Example 1 was repeated except that the epoxy-silane-treated "ME 100" was not used. While the resulting composition was burning, the dripping of the resin was observed. The composition was thus found to be poor in fire retardancy.

Comparative Example 12

The procedure of Example 1 was repeated except that the amount of the epoxy-silane-treated "ME 100" was changed to 20 parts. The resulting composition had an extremely increased melt viscosity, showed greatly increased resistance to mold release, and was poor in mechanical properties.

Comparative Example 13

The procedure of Example 1 was repeated except that the amount of the "MARK PEP 36" was changed to 20 parts. The resulting composition showed greatly increased resistance to mold release, and was poor in mechanical properties. In addition, plate-out was also observed.

Comparative Example 14

The procedure of Example 1 was repeated except that the amount of the PBT was changed to 50 parts and that 50 parts of the LCP was used instead of 20 parts of the PPE. The resulting composition showed greatly increased resistance to mold release, and was very poor in resistance to hydrolysis and fire retardancy.

Comparative Example 15

The procedure of Example 1 was repeated except that the amount of the PBT was changed to 50 parts and that 50 parts of the polycarbonate was used instead of 20 parts of the PPE. The resulting composition showed greatly increased resistance to mold release, and was very poor in resistance to hydrolysis and fire retardancy.

Comparative Example 16

The procedure of Example 28 was repeated except that the amount of "MODIPER A 4100" was changed to 25 parts.

Comparative Example 17

The procedure of Example 30 was repeated except that the amount of the epoxy-modified polystyrene (s) was changed to 25 parts.

The formulations of the compositions of Examples 1 to 30 and Comparative Examples 1 to 17 are shown in Tables 1 to 6, and the results of the evaluations are shown in Tables 7 to 15.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| PBT (parts) | 80 | 90 | 60 | 50 | 50 | 40 | 40 | 80 | 80 | 80 | 80 |
| PPE (parts) | 20 | 10 | 40 | 50 | 50 | 60 | 60 | 20 | 20 | 20 | 20 |
| PEP36 (parts) | 1.0 | 1.0 | 1.0 | 1.0 | 1.0 | 1.0 | 1.0 | 1.0 | 1.0 | 1.0 | 1.0 |
| Phosphoric ester of formula (10) (parts) | 15 | 15 | 15 | 15 | 30 | 15 | 15 | 15 | 15 | 15 | 15 |
| Melamine cyanurate (parts) | 15 | 15 | 15 | 15 | — | 15 | 15 | 15 | 15 | 15 | 15 |
| Glass chopped strand (parts) | 60 | 60 | 60 | 60 | 60 | 60 | 65 | 0 | 20 | 100 | — |

TABLE 1-continued

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Milled fiber (parts) | — | — | — | — | — | — | — | — | — | — | 60 |
| Epoxy-silane-treated ME100 (parts) | 2.0 | 2.0 | 2.0 | 2.0 | 2.0 | 2.0 | 2.0 | 2.0 | 2.0 | 2.0 | 2.0 |
| PSt (parts) | — | — | — | — | — | — | 10 | — | — | — | — |

TABLE 2

|  | Example 12 | Example 13 | Example 14 | Example 15 | Example 16 | Example 17 | Example 18 | Example 19 | Example 20 |
|---|---|---|---|---|---|---|---|---|---|
| PBT (parts) | 80 | 80 | 80 | 80 | 80 | 80 | 80 | 80 | 80 |
| PPE (parts) | 20 | 20 | 20 | 20 | 20 | 20 | 20 | 20 | 20 |
| PEP36 (parts) | 1.0 | 1.0 | 1.0 | 1.0 | 1.0 | 1.0 | 1.0 | 1.0 | 1.0 |
| Phosphoric ester of formula (10) (parts) | 15 | 15 | 7.5 | 22.5 | 10 | 15 | 15 | — | — |
| Phosphoric ester of formula (11) (parts) | — | — | — | — | — | — | — | 15 | — |
| Phosphoric ester of formula (12) (parts) | — | — | — | — | — | — | — | — | 15 |
| Melamine cyanurate (parts) | 15 | 15 | 22.5 | 7.5 | 10 | 15 | 15 | 15 | 15 |
| Glass chopped strand (parts) | 60 | 60 | 60 | 60 | 60 | 60 | 60 | 60 | 60 |
| Epoxy-silane-treated ME100 (parts) | — | — | 2.0 | 2.0 | 2.0 | — | — | 2.0 | 2.0 |
| Organo-modified ME100 (parts) | 2.0 | — | — | — | — | — | — | — | — |
| Epoxy-silane-treated organo-modified ME100 (parts) | — | 2.0 | — | — | — | — | — | — | — |
| Polytetrafluoroethylene (parts) | — | — | — | — | — | 0.05 | — | — | — |
| Silicone oil (parts) | — | — | — | — | — | — | 1.0 | — | — |

TABLE 3

|  | Example 21 | Example 22 | Example 23 | Example 24 | Example 25 | Example 26 | Example 27 |
|---|---|---|---|---|---|---|---|
| PBT (parts) | 80 | 80 | — | 80 | 80 | 80 | 80 |
| PET (parts) | — | — | 80 | — | — | — | — |
| PPE (parts) | 20 | 20 | 20 | 15 | 5.0 | 20 | 15 |
| PPS (parts) | — | — | — | 5.0 | 15 | — | — |
| PEP36 (parts) | 1.0 | 1.0 | 1.0 | 1.0 | 1.0 | 1.0 | — |
| Epoxy-group-additioned PPE (parts) | — | — | — | — | — | — | 5.0 |
| Phosphoric ester of formula (10) (parts) | — | — | 15 | 15 | 15 | 15 | 15 |
| Phosphonitrile having formula (13) (parts) | 30 | — | — | — | — | — | — |
| Phosphoric ester of formula (14) (parts) | — | 15 | — | — | — | — | — |
| Melamine cyanurate (parts) | — | 15 | 15 | 15 | 15 | 15 | 15 |
| Glass chopped strand (parts) | 60 | 60 | 60 | 60 | 60 | 60 | 60 |
| Epoxy-silane-treated ME100 (parts) | 2.0 | 2.0 | 2.0 | — | — | 2.0 | 2.0 |
| Xylene (parts) | — | — | — | — | — | 3.0 | — |

TABLE 4

|  |  | Example 28 | Example 29 | Example 30 |
|---|---|---|---|---|
| PBT | (parts) | 80 | 80 | 80 |
| PPE | (parts) | 20 | 20 | 20 |
| PEP36 | (parts) | 1.0 | 1.0 | 1.0 |
| Phosphoric ester of formula (10) | (parts) | 15 | 15 | 15 |
| Melamine cyanurate | (parts) | 15 | 15 | 15 |
| Glass chopped strand | (parts) | 60 | 60 | 60 |
| Epoxy-silane-treated ME100 | (parts) | 2.0 | 2.0 | 2.0 |
| MODIPER A 4100 | (parts) | 4.0 | — | — |
| RESEDA GP 500 | (parts) | — | 4.0 | — |
| Epoxy-modified Pst | (parts) | — | — | 4.0 |

TABLE 5

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| PBT (parts) | 100 | 80 | 60 | 98 | 10 | 80 | 80 | 80 | 80 |
| PPE (parts) | — | 20 | 40 | 2.0 | 90 | 20 | 20 | 20 | 20 |
| PEP36 (parts) | 1.0 | — | — | 1.0 | 1.0 | 1.0 | 1.0 | 1.0 | 1.0 |
| Phosphoric ester of formula (10) (parts) | 15 | 15 | 15 | 15 | 15 | 30 | 0 | 60 | 1.0 |
| Melamine cyanurate (parts) | 15 | 15 | 15 | 15 | 15 | 0 | 30 | 60 | 1.0 |
| Glass chopped strand (parts) | 60 | 60 | 60 | 60 | 60 | 60 | 60 | 90 | 50 |
| Epoxy-silane-treated ME100 (parts) | 2.0 | 2.0 | 2.0 | 2.0 | 2.0 | 2.0 | 2.0 | 2.0 | 2.0 |

TABLE 6

|  | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|
| PBT (parts) | 80 | 80 | 80 | 80 | 50 | 50 | 80 | 80 |
| PPE (parts) | 20 | 20 | 20 | 20 | — | — | 20 | 20 |
| LCP (parts) | — | — | — | — | 50 | — | — | — |
| PCR (parts) | — | — | — | — | — | 50 | — | — |
| PEP36 (parts) | 1.0 | 1.0 | 1.0 | 20 | 1.0 | 1.0 | 1.0 | 1.0 |
| Phosphoric ester of formula(10) (parts) | 15 | 15 | 15 | 15 | 15 | 15 | 15 | 15 |
| Melamine cyanurate (parts) | 15 | 15 | 15 | 15 | 15 | 15 | 15 | 15 |
| Glass chopped strand (parts) | 180 | 60 | 60 | 60 | 60 | 60 | 60 | 60 |
| Epoxy-silane-treated ME100 (parts) | 2.0 | 0 | 20 | 2.0 | 2.0 | 2.0 | 2.0 | 2.0 |
| MODIPER A 4100 (parts) | — | — | — | — | — | — | 25 | — |
| Epoxy-modified polystyrene (parts) | — | — | — | — | — | — | — | 25 |

TABLE 7

|  | Example 1 | Example 2 | Example 3 | Example 4 | Example 5 | Example 6 |
|---|---|---|---|---|---|---|
| UL94 | V-0 | V-0 | V-0 | V-0 | V-0 | V-0 |
| LOI | 31.5 | 29.8 | 32.4 | 33.4 | 32.9 | 34.6 |
| Flexural modulus (kgf/cm$^2$) | 79700 | 80600 | 77400 | 74800 | 75900 | 73100 |
| Flexural strength (kgf/cm$^2$) | 1940 | 1950 | 1910 | 1860 | 1880 | 1810 |
| Retention of the tensile strength after exposure to water vapor (%) | 86 | 82 | 89 | 84 | 81 | 86 |
| Tc (°C.) | 201 | 201 | 198 | 194 | 188 | 192 |
| Plate-out | not observed | not observed | not observed | not observed | not observed | not observed |
| Melt viscosity (poises) | 3400 | 3200 | 4300 | 5600 | 4200 | 7700 |
| Resistance to mold release (kgf/cm$^2$) | 47 | 45 | 52 | 51 | 58 | 53 |
| IZOD Impact strength (kg · cm/cm) | 8.1 | 8.3 | — | — | — | — |

TABLE 8

|  | Example 7 | Example 8 | Example 9 | Example 10 | Example 11 | Example 12 |
|---|---|---|---|---|---|---|
| UL94 | V-0 | V-0 | V-0 | V-0 | V-0 | V-0 |
| LOI | 30.1 | 28.6 | 29.5 | 31.8 | 30.3 | 31.3 |
| Flexural modulus (kgf/cm$^2$) | 72500 | 27200 | 48800 | 122000 | 50100 | 79200 |
| Flexural strength (kgf/cm$^2$) | 1730 | 880 | 1470 | 2070 | 1260 | 1900 |
| Retention of the tensile strength after exposure to water vapor (%) | 84 | 80 | 86 | 90 | 77 | 85 |
| Tc (°C.) | 180 | 200 | 202 | 202 | 201 | 200 |
| Plate-out | not observed | not observed | not observed | not observed | not observed | not observed |
| Melt viscosity (poises) | 5900 | 2300 | 2800 | 5200 | 2900 | 3300 |

TABLE 8-continued

|  | Example 7 | Example 8 | Example 9 | Example 10 | Example 11 | Example 12 |
|---|---|---|---|---|---|---|
| Resistance to mold release (kgf/cm$^2$) | 56 | 49 | 49 | 47 | 48 | 47 |
| IZOD Impact strength (kg · cm/cm) | — | — | — | — | — | — |

TABLE 9

|  | Example 13 | Example 14 | Example 15 | Example 16 | Example 17 | Example 18 |
|---|---|---|---|---|---|---|
| UL94 | V-0 | V-0 | V-0 | V-0 | V-0 | V-0 |
| LOI | 32.1 | 31.3 | 31.6 | 30.1 | 31.0 | 30.9 |
| Flexural modulus (kgf/cm$^2$) | 80200 | 79500 | 78900 | 79900 | 79000 | 78800 |
| Flexural strength (kgf/cm$^2$) | 2060 | 1930 | 1840 | 1950 | 1900 | 1870 |
| Retention of the tensile strength after exposure to water vapor (%) | 85 | 88 | 79 | 89 | 84 | 85 |
| Tc (°C.) | 200 | 202 | 198 | 201 | 202 | 197 |
| Plate-out | not observed | not observed | not observed | not observed | not observed | not observed |
| Melt viscosity (poises) | 3500 | 3500 | 2900 | 3700 | 4200 | 4400 |
| Resistance to mold release (kgf/cm$^2$) | 48 | 46 | 45 | 48 | 54 | 58 |
| IZOD Impact strength (kg · m/cm) | — | — | — | — | — | — |

TABLE 10

|  | Example 19 | Example 20 | Example 21 | Example 22 | Example 23 | Example 24 |
|---|---|---|---|---|---|---|
| UL94 | V-0 | V-0 | V-0 | V-0 | V-0 | V-0 |
| LOI | 31.3 | 30.5 | 30.8 | 30.4 | 31.9 | 31.9 |
| Flexural modulus (kgf/cm$^2$) | 79500 | 79100 | 79000 | 79900 | 78700 | 80200 |
| Flexural strength (kgf/cm$^2$) | 1940 | 1910 | 1920 | 1950 | 1900 | 1940 |
| Retention of the tensile strength after exposure to water vapor (%) | 84 | 82 | 93 | 58 | 85 | 84 |
| Tc (°C.) | 200 | 202 | 200 | 202 | 200 | 200 |
| Plate-out | not observed | not observed | not observed | not observed | not observed | not observed |
| Melt viscosity (poises) | 3500 | 3600 | 3500 | 3500 | 3200 | 3800 |
| Resistance to mold release (kgf/cm$^2$) | 48 | 49 | 49 | 47 | 45 | 49 |
| IZOD Impact strength (kg · cm/cm) | — | — | — | — | — | — |

TABLE 11

|  | Example 25 | Example 26 | Example 27 |
|---|---|---|---|
| UL94 | V-0 | V-0 | V-0 |
| LOI | 32.2 | 31.6 | 30.2 |
| Flexural modulus (kgf/cm$^2$) | 81500 | 80700 | 76700 |
| Flexural strength (kgf/cm$^2$) | 1950 | 2030 | 1830 |
| Retention of the tensile strength after exposure to water vapor (%) | 85 | 87 | 83 |
| Tc (°C.) | 201 | 201 | 198 |
| Plate-out | not observed | not observed | not observed |
| Melt viscosity (poises) | 4400 | 3400 | 3700 |
| Resistance to mold release (kgf/cm$^2$) | 48 | 46 | 57 |
| IZOD Impact strength (kg · cm/cm) | — | — | — |

TABLE 12

|  | Example 28 | Example 29 | Example 30 |
|---|---|---|---|
| UL94 | V-0 | V-0 | V-0 |
| LOI | 30.9 | 30.4 | 30.8 |
| Flexural modulus (kgf/cm$^2$) | 80900 | 80600 | 81000 |
| Flexural strength (kgf/cm$^2$) | 1970 | 1950 | 1960 |
| Retention of the tensile strength after exposure to water vapor (%) | 90 | 87 | 89 |
| Tc (°C.) | 201 | 199 | 200 |
| Plate-out | not observed | not observed | not observed |
| Melt viscosity (poises) | 3400 | 3500 | 3400 |
| Resistance to mold release (kgf/cm$^2$) | 48 | 54 | 51 |
| IZOD Impact strength (kg · cm/cm) | 10.5 | 10.2 | 10.4 |

TABLE 13

|  | Comparative Example 1 | Comparative Example 2 | Comparative Example 3 | Comparative Example 4 | Comparative Example 5 | Comparative Example 6 |
|---|---|---|---|---|---|---|
| UL94 | V-2 | V-2 | V-2 | V-2 | V-2 | V-2 |
| LOI | 23.2 | 26.1 | 27.9 | 23.4 | 34.7 | 25.9 |
| Flexural modulus (kgf/cm$^2$) | 79500 | 65200 | 70400 | 79700 | 62400 | 72100 |
| Flexural strength (kgf/cm$^2$) | 1940 | 990 | 1030 | 1890 | 1570 | 1020 |
| Retention of the tensile strength after exposure to water vapor (%) | 21 | 25 | 29 | 14 | 88 | 85 |
| Tc (°C.) | 202 | 199 | 200 | 201 | 168 | 171 |
| Plate-out | not observed | not observed | not observed | not observed | not observed | not observed |
| Melt viscosity (poises) | 3100 | 3800 | 4800 | 3100 | 14300 | 3400 |
| Resistance to mold release (kgf/cm$^2$) | 46 | 47 | 52 | 47 | 184 | 152 |
| IZOD Impact strength (kg · cm/cm) | 6.2 | 2.3 | 2.1 | 6.4 | — | — |

TABLE 14

|  | Comparative Example 7 | Comparative Example 8 | Comparative Example 9 | Comparative Example 10 | Comparative Example 11 | Comparative Example 12 |
|---|---|---|---|---|---|---|
| UL94 | V-2 | V-0 | V-2 | V-0 | V-2 | V-2 |
| LOI | 25.0 | 32.0 | 25.7 | 29.7 | 26.1 | 23.7 |
| Flexural modulus (kgf/cm$^2$) | 73400 | 75700 | 78300 | 133000 | 78700 | 65100 |
| Flexural strength (kgf/cm$^2$) | 1860 | 1020 | 1850 | 1570 | 1880 | 1070 |
| Retention of the tensile strength after exposure to water vapor (%) | 81 | 14 | 87 | 83 | 84 | 62 |
| Tc (°C.) | 201 | 192 | 201 | 200 | 200 | 182 |
| Plate-out | not observed | observed | not observed | not observed | not observed | observed |
| Melt viscosity (poises) | 13900 | 2800 | 4100 | 9100 | 3600 | 8200 |
| Resistance to mold release (kgf/cm$^2$) | 44 | 143 | 49 | 141 | 46 | 153 |
| IZOD Impact strength (kg · cm/cm) | — | — | — | — | — | — |

TABLE 15

|  | Example 13 | Example 14 | Example 15 | Example 16 | Example 17 |
|---|---|---|---|---|---|
| UL94 | V-2 | V-2 | V-2 | V-2 | V-2 |
| LOI | 23.9 | 26.3 | 25.5 | 26.1 | 26.3 |
| Flexural modulus (kgf/cm$^2$) | 66400 | 73200 | 75300 | 68200 | 66100 |
| Flexural strength (kgf/cm$^2$) | 1270 | 1810 | 1780 | 1620 | 1640 |
| Retention of the tensile strength after exposure to water vapor (%) | 34 | 28 | 25 | 85 | 81 |
| Tc (°C.) | 172 | 171 | 173 | 199 | 198 |
| Plate-out | observed | not observed | not observed | not observed | not observed |
| Melt viscosity (poises) | 4200 | 3500 | 4100 | 3900 | 3700 |
| Resistance to mold release (kgf/cm$^2$) | 173 | 158 | 154 | 168 | 181 |
| IZOD Impact strength (kg · cm/cm) | — | — | — | 5.7 | 5.3 |

What is claimed is:

1. A fire retardant polyester resin composition comprising the following components (A) to (H):

(A) 95 to 30 parts by weight of a polyester resin, and (B) 5.0 to 70 parts by weight of a polyphenylene ether resin and/or polyphenylene sulfide resin, and, for 100 parts by weight in total of the components (A) and (B), (C) 0.05 to 10 parts by weight of a compatibilizing agent, (D) 2.0 to 45 parts by weight of a phosphoric ester compound or phosphonitrile compound, wherein said phosphoric ester compound is represented by the general formula (1):

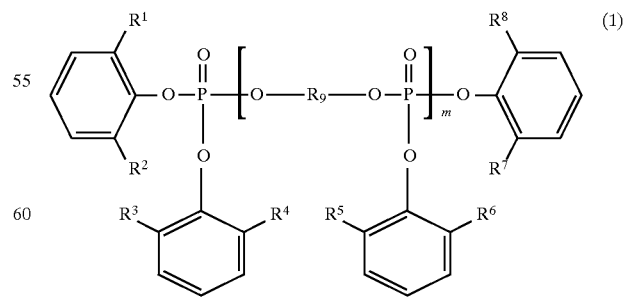

wherein $R^1$ to $R^8$ are hydrogen atom or an alkyl group having 1 to 6 carbon atoms, m is an integer of 1 to 4, and $R^9$ represents a structure selected from the following:

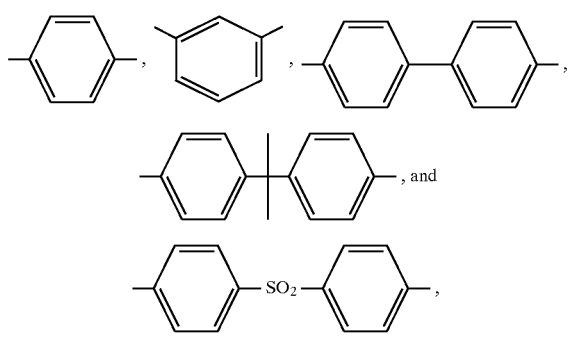

and wherein said phosphonitrile compound has a group represented by the general formula (2):

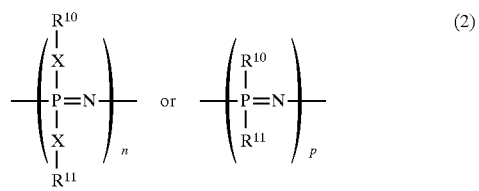

wherein X represents O, S or N-H, $R^{10}$ and $R^{11}$ are an aryl, alkyl or cycloalkyl gropu have 1 to 20 carbon atoms, $-X-R^{10}$ and $-X-R^{11}$ may be the same or different, and n and p are an integer of 1 to 12, (E) 0 to 150 parts by weight of a reinforcing filler,
(F) 0.001 to 15 parts by weight of an anti-dripping agent,
(G) 0 to 45 parts by weight of a melamine cyanurate, and
(H) 0 to 15 parts by weight of a polystyrene resin having an epoxy group, provided that the amount of the component (G) is from 0.5 to 45 parts by weight for 100 parts by weight in total of the components (A) and (B) when the amount of the component (B) is less than 35 parts by weight.

2. The fire retardant polyester resin composition according to claim 1, wherein the compatibilizing agent, the component (C), is a phosphorous triester.

3. The fire retardant polyester resin composition according to claim 1, comprising 0.1 to 15 parts by weight for 100 parts by weight in total of the components (A) and (B) of a layered silicate as the anti-dripping agent, the component (F).

4. The fire retardant polyester resin composition according to claim 3, wherein the layered silicate has a reactive functional group.

5. The fire retardant polyester resin composition according to claim 1, comprising 0.001 to 10 parts by weight for 100 parts by weight in total of the components (A) and (B) of a fluorine-containing polymer as the anti-dripping agent, the component (F).

6. The fire retardant polyester resin composition according to claim 1, comprising 0.001 to 10 parts by weight for 100 parts by weight in total of the components (A) and (B) of a silicone oil as the anti-dripping agent, the component (F).

7. The fire retardant polyester resin composition according to claim 1, wherein the polyphenylene ether resin and/or polyphenylene sulfide resin, the component (B), is a mixture of a polyphenylene ether resin and a polyphenylene sulfide resin in a weight % ratio of (5–99):(95–1).

8. The fire retardant polyester resin composition according to claim 1, wherein the polyester resin, the component (A), is a polyalkylene terephthalate.

9. A process for producing a fire retardant polyester resin composition comprising the following components (A) and (H):

(A) 95 to 30 parts by weight of a polyester resin, and
(B) 5.0 to 70 parts by weight of a polyphenylene ether resin and/or polyphenylene sulfide resin, and, for 100 parts by weight in total of the components (A) and (B),
(C) 0.05 to 10 parts by weight of a compatibilizing agent,
(D) 2.0 to 45 parts by weight of a phosphoric ester compound or phosphonitrile compound, wherein said phosphoric ester compound is represented by the general formula (1):

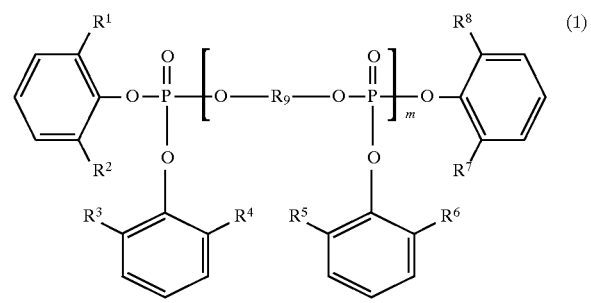

wherein $R^1$ to $R^8$ are hydrogen atom or an alkyl group having 1 to 6 carbon atoms, m is an integer of 1 to 4, and $R^9$ represents a structure selected from the following:

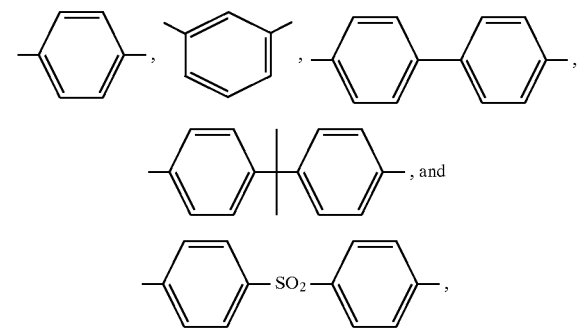

and wherein said phosphonitrile compound has a group represented by the general formula (2):

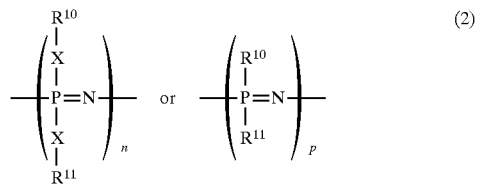

wherein X represents O, S or N-H, $R^{10}$ and $R^{11}$ are an aryl, alkyl or cycloalkyl group having 1 to 20 carbon atoms, $-X-R^{10}$ and $-X-R^{11}$ may be the same or different, and n and p are an integer of 1 to 12, (E) 0 to 150 parts by weight of a reinforcing filler,
(F) 0.001 to 15 parts by weight of an anti-dripping agent,
(G) 0 to 45 parts by weight of a melamine cyanurate, and
(H) 0 to 15 parts by weight of a polystyrene resin having an epoxy group, provided that the amount of the component (G) is from 0.5 to 45 parts by weight for 100 parts by weight in total of the components (A) and (B) when the amount of the component (B) is less than 35 parts by weight, in which the polyester resin (the component (A)), the polyphenylene ether resin and/or polyphenylene sulfide resin (the component (B)) and the compatibilizing agent (the component (C)) are firstly melt-kneaded to form a mixture, and the mixture is then melt-kneaded with the other components ([)) to (H) to obtain the desired fire retardant polyester resin composition.

10. The process for producing the fire retardant polyester resin composition according to claim 9, wherein the polyester resin (the component (A)), the polyphenylene ether resin and/or polyphenylene sulfide resin (the component (B)), and the compatibilizing agent (the component (C)) are melt-kneaded under the presence of an organic solvent in which the component (B) can be dissolved.

11. The process for producing the fire retardant polyester resin composition according to claim 9, wherein the polyphenylene ether resin and/or polyphenylene sulfide resin, the component (B), is a mixture of a polyphenylene ether resin and a polyphenylene sulfide resin in a weight % ratio of (5–99):(95–1).

* * * * *